(12) United States Patent
Faus et al.

(10) Patent No.: US 9,928,041 B2
(45) Date of Patent: *Mar. 27, 2018

(54) MANAGING A SOFTWARE APPLIANCE (71) Applicant: Red Hat, Inc., Raleigh, NC (US)

(72) Inventors: Norman L. Faus, Raleigh, NC (US);
David P. Huff, Raleigh, NC (US);
Bryan M. Kearney, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 231 days.

This patent is subject to a terminal disclaimer.

(21) Appl. No.: 14/807,131

(22) Filed: Jul. 23, 2015

(65) Prior Publication Data

US 2015/0331676 A1     Nov. 19, 2015

Related U.S. Application Data

(63) Continuation of application No. 12/128,299, filed on May 28, 2008, now Pat. No. 9,092,243.

(51) Int. Cl.
*G06F 9/44* (2006.01)
*G06F 9/445* (2018.01)

(52) U.S. Cl.
CPC ............... *G06F 8/36* (2013.01); *G06F 8/71* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 5,664,206 A | * | 9/1997 | Murow ................ G06F 9/4448 704/5 |
| 6,367,077 B1 | | 4/2002 | Brodersen et al. |
| 6,393,569 B1 | | 5/2002 | Orenshteyn |
| 6,463,457 B1 | | 10/2002 | Armentrout et al. |
| 6,578,199 B1 | | 6/2003 | Tsou et al. |
| 7,140,028 B2 | | 11/2006 | Bentley et al. |

(Continued)

OTHER PUBLICATIONS

"RBuilder and the rPath Appliance Platform", 2007 rPath, Inc., www.rpath.com, 3 pages.

(Continued)

*Primary Examiner* — Chameli Das
(74) *Attorney, Agent, or Firm* — Lowenstein Sandler LLP (57) ABSTRACT

Managing a software appliance is disclosed. A described method includes receiving from a user, a request specifying functionality of a custom software appliance and searching a repository, in view of the functionality, a pre-built software appliance, a recipe and a software component. The method also includes building the custom software appliance in view of the pre-built software appliance, the recipe and the software component. The custom software appliance includes information of the user. The method further includes providing an interface for the custom software appliance and an application to perform a function and a portion of an operating system to provide an execution platform for the application. The custom software appliance includes a management tool, which is embedded within the custom software appliance and provides the interface to receive a management request to cause the management tool to manage the application, and the portion of the operating system.

20 Claims, 7 Drawing Sheets

(56) References Cited

U.S. PATENT DOCUMENTS

| | | |
|---|---|---|
| 7,313,796 B2 | 12/2007 | Hamilton et al. |
| 7,439,937 B2 | 10/2008 | Ben-Shachar et al. |
| 7,461,095 B2 | 12/2008 | Cohen et al. |
| 7,529,785 B1 | 5/2009 | Spertus et al. |
| 7,546,462 B2 | 6/2009 | Upton |
| 7,577,722 B1 | 8/2009 | Khandekar et al. |
| 7,596,620 B1 | 9/2009 | Colton et al. |
| 7,624,394 B1 | 11/2009 | Christopher, Jr. |
| 7,743,001 B1 | 6/2010 | Vermeulen et al. |
| 7,793,288 B2 | 9/2010 | Sameske |
| 7,886,038 B2 | 2/2011 | Ferris |
| 7,945,897 B1 | 5/2011 | Cook |
| 7,996,648 B2 | 8/2011 | England et al. |
| 8,074,201 B2 | 12/2011 | Ghercioiu et al. |
| 8,108,912 B2 | 1/2012 | Ferris |
| 8,176,094 B2 | 5/2012 | Friedman |
| 8,181,174 B2 | 5/2012 | Liu |
| 8,201,144 B2 | 6/2012 | Rogers et al. |
| 8,239,509 B2 | 8/2012 | Ferris et al. |
| 8,255,650 B1 | 8/2012 | Gruttadauria et al. |
| 8,458,658 B2 | 6/2013 | Ferris et al. |
| 8,504,433 B2 | 8/2013 | Ferris et al. |
| 8,504,443 B2 | 8/2013 | Ferris et al. |
| 9,116,776 B2 | 8/2015 | Boggs et al. |
| 9,210,173 B2 | 12/2015 | Ferris et al. |
| 2001/0039497 A1 | 11/2001 | Hubbard |
| 2001/0052108 A1* | 12/2001 | Bowman-Amuah .. G06Q 10/06 717/100 |
| 2002/0029326 A1 | 3/2002 | Reuter et al. |
| 2002/0069276 A1 | 6/2002 | Hino et al. |
| 2002/0112171 A1 | 8/2002 | Ginter et al. |
| 2002/0086688 A1 | 9/2002 | Kang |
| 2002/0129352 A1 | 9/2002 | Brodersen et al. |
| 2002/0152372 A1 | 10/2002 | Cole et al. |
| 2002/0165819 A1 | 11/2002 | McKnight et al. |
| 2002/0188869 A1 | 12/2002 | Patrick |
| 2003/0023839 A1 | 1/2003 | Burkhardt et al. |
| 2003/0037258 A1 | 3/2003 | Koren |
| 2003/0110252 A1 | 6/2003 | Yang-Huffman |
| 2003/0121024 A1 | 6/2003 | Hill et al. |
| 2003/0135609 A1 | 7/2003 | Carlson et al. |
| 2003/0160823 A1 | 8/2003 | Stannard |
| 2003/0167354 A1* | 9/2003 | Peppers ................... G06F 8/60 719/327 |
| 2004/0162902 A1 | 8/2004 | Davis |
| 2004/0177342 A1 | 9/2004 | Worley, Jr. |
| 2004/0181773 A1 | 9/2004 | Mortensen et al. |
| 2004/0199572 A1 | 10/2004 | Hunt et al. |
| 2004/0210591 A1 | 10/2004 | Hirschfeld et al. |
| 2004/0210627 A1 | 10/2004 | Kroening |
| 2004/0268347 A1 | 12/2004 | Knauerhase et al. |
| 2005/0044541 A1 | 2/2005 | Parthasarathy et al. |
| 2005/0044546 A1 | 2/2005 | Niebling et al. |
| 2005/0071847 A1 | 3/2005 | Bentley et al. |
| 2005/0125513 A1 | 6/2005 | Sin-Ling Lam et al. |
| 2005/0131898 A1 | 6/2005 | Fatula |
| 2005/0144060 A1 | 6/2005 | Chen et al. |
| 2005/0149447 A1 | 7/2005 | Sherkow |
| 2005/0182727 A1 | 8/2005 | Robert et al. |
| 2005/0198628 A1 | 9/2005 | Graham et al. |
| 2005/0262549 A1 | 11/2005 | Ritt et al. |
| 2005/0289508 A1* | 12/2005 | Illowsky ............... G06F 1/3203 717/106 |
| 2005/0289540 A1 | 12/2005 | Nguyen et al. |
| 2006/0031598 A1 | 2/2006 | Blanchard et al. |
| 2006/0074880 A1* | 4/2006 | Bukary ................. G06Q 10/00 |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0101451 A1 | 5/2006 | Fong |
| 2006/0130144 A1 | 6/2006 | Wernicke |
| 2006/0146991 A1 | 7/2006 | Thompson et al. |
| 2006/0155735 A1 | 7/2006 | Traut et al. |
| 2006/0177058 A1 | 8/2006 | Sarwono et al. |
| 2006/0195832 A1 | 8/2006 | Chandley et al. |
| 2006/0218544 A1 | 9/2006 | Chakraborty et al. |
| 2006/0218547 A1 | 9/2006 | Purkeypile et al. |
| 2006/0224436 A1 | 10/2006 | Matsumoto et al. |
| 2006/0277542 A1 | 12/2006 | Wipfel |
| 2007/0011291 A1 | 1/2007 | Mi et al. |
| 2007/0028001 A1 | 2/2007 | Phillips et al. |
| 2007/0053513 A1 | 3/2007 | Hoffberg |
| 2007/0078988 A1 | 4/2007 | Miloushev et al. |
| 2007/0101116 A1 | 5/2007 | Tsuji |
| 2007/0105627 A1 | 5/2007 | Campbell |
| 2007/0150865 A1 | 6/2007 | Rajput |
| 2007/0074201 A1 | 7/2007 | Lee |
| 2007/0159650 A1 | 7/2007 | Takamatsu et al. |
| 2007/0168926 A1 | 7/2007 | Rajah et al. |
| 2007/0168962 A1 | 7/2007 | Heinke et al. |
| 2007/0169079 A1 | 7/2007 | Keller et al. |
| 2007/0226715 A1 | 9/2007 | Kimura et al. |
| 2007/0245332 A1 | 10/2007 | Tai et al. |
| 2007/0250672 A1 | 10/2007 | Stroberger et al. |
| 2007/0283282 A1 | 12/2007 | Bonfiglio et al. |
| 2007/0294314 A1 | 12/2007 | Padovano et al. |
| 2007/0294676 A1 | 12/2007 | Mellor et al. |
| 2008/0004904 A1 | 1/2008 | Tran |
| 2008/0022271 A1 | 1/2008 | D'Angelo et al. |
| 2008/0052384 A1 | 2/2008 | Marl et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0109876 A1 | 5/2008 | Hitomi et al. |
| 2008/0127087 A1 | 5/2008 | Brookins et al. |
| 2008/0134178 A1 | 6/2008 | Fitzgerald et al. |
| 2008/0215796 A1 | 9/2008 | Bazigos et al. |
| 2008/0263258 A1 | 9/2008 | Allwell et al. |
| 2008/0240150 A1 | 10/2008 | Dias et al. |
| 2008/0256516 A1 | 10/2008 | Chaar et al. |
| 2009/0012885 A1 | 1/2009 | Cahn |
| 2009/0013061 A1 | 1/2009 | Winter et al. |
| 2009/0013309 A1* | 1/2009 | Shavlik ..................... G06F 8/34 717/120 |
| 2009/0025006 A1 | 1/2009 | Waldspurger |
| 2009/0037496 A1 | 2/2009 | Chong et al. |
| 2009/0083734 A1 | 3/2009 | Hotral |
| 2009/0089078 A1 | 4/2009 | Bursey |
| 2009/0089407 A1 | 4/2009 | Chalupa et al. |
| 2009/0089738 A1 | 4/2009 | Krueger et al. |
| 2009/0099940 A1 | 4/2009 | Frederick et al. |
| 2009/0103722 A1 | 4/2009 | Anderson et al. |
| 2009/0132695 A1 | 5/2009 | Surtani et al. |
| 2009/0144718 A1* | 6/2009 | Boggs ..................... G06F 8/65 717/170 |
| 2009/0177514 A1 | 7/2009 | Hudis et al. |
| 2009/0210527 A1 | 8/2009 | Kawato |
| 2009/0210869 A1 | 8/2009 | Gebhart et al. |
| 2009/0210875 A1 | 8/2009 | Bolles et al. |
| 2009/0217244 A1 | 8/2009 | Bozak et al. |
| 2009/0217263 A1 | 8/2009 | Gebhart et al. |
| 2009/0217267 A1 | 8/2009 | Gebhart et al. |
| 2009/0222805 A1* | 9/2009 | Faus ........................ G06F 8/61 717/168 |
| 2009/0222806 A1* | 9/2009 | Faus ........................ G06F 8/63 717/168 |
| 2009/0222808 A1 | 9/2009 | Faus |
| 2009/0228950 A1 | 9/2009 | Reed et al. |
| 2009/0248693 A1 | 10/2009 | Sagar et al. |
| 2009/0249279 A1 | 10/2009 | Bourdon |
| 2009/0249287 A1 | 10/2009 | Patrick |
| 2009/0249488 A1 | 10/2009 | Robinson et al. |
| 2009/0260007 A1 | 10/2009 | Beaty et al. |
| 2009/0265707 A1 | 10/2009 | Goodman et al. |
| 2009/0271324 A1 | 10/2009 | Jandyala et al. |
| 2009/0276771 A1 | 11/2009 | Nickolov et al. |
| 2009/0287691 A1 | 11/2009 | Sundaresan et al. |
| 2009/0293056 A1 | 11/2009 | Ferris |

(56) References Cited

U.S. PATENT DOCUMENTS

| | | |
|---|---|---|
| 2009/0064086 A1 | 12/2009 | Faus |
| 2009/0217255 A1 | 12/2009 | Troan |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300164 A1 | 12/2009 | Boggs |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300584 A1 | 12/2009 | Faus |
| 2009/0300593 A1 | 12/2009 | Faus |
| 2009/0300607 A1 | 12/2009 | Ferris et al. |
| 2009/0300608 A1 | 12/2009 | Ferris et al. |
| 2009/0300635 A1 | 12/2009 | Ferris |
| 2009/0300641 A1 | 12/2009 | Friedman et al. |
| 2009/0300719 A1 | 12/2009 | Ferris |
| 2009/0327683 A1 | 12/2009 | Cabot et al. |
| 2010/0031234 A1 | 2/2010 | Chaar et al. |
| 2010/0042720 A1 | 2/2010 | Steinhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0095270 A1 | 4/2010 | Seitz et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Steinhans et al. |
| 2010/0217850 A1 | 8/2010 | Ferris |
| 2010/0217864 A1 | 8/2010 | Ferris |
| 2010/0217865 A1 | 8/2010 | Ferris |
| 2010/0218237 A1 | 8/2010 | Ferris |
| 2010/0220622 A1 | 9/2010 | Wei |
| 2010/0235482 A1 | 9/2010 | Chalupa et al. |
| 2010/0235813 A1 | 9/2010 | Manczak et al. |
| 2010/0299366 A1 | 11/2010 | Stienhans et al. |
| 2010/0299514 A1 | 11/2010 | Samba et al. |
| 2010/0306354 A1 | 12/2010 | DeHaan |
| 2010/0306377 A1 | 12/2010 | DeHaan |
| 2010/0306379 A1 | 12/2010 | Ferris |
| 2010/0306566 A1 | 12/2010 | DeHaan |
| 2010/0306765 A1 | 12/2010 | DeHaan |
| 2010/0306767 A1 | 12/2010 | DeHaan |
| 2010/0306773 A1 | 12/2010 | Lee et al. |
| 2011/0004676 A1 | 1/2011 | Kawato |
| 2011/0010420 A1 | 1/2011 | Kagitani |
| 2011/0016214 A1 | 1/2011 | Jackson |
| 2011/0035733 A1 | 2/2011 | Horning et al. |
| 2011/0055034 A1 | 3/2011 | Ferris |
| 2011/0055377 A1 | 3/2011 | DeHaan |
| 2011/0055378 A1 | 3/2011 | Ferris |
| 2011/0055396 A1 | 3/2011 | DeHaan |
| 2011/0055398 A1 | 3/2011 | DeHaan |
| 2011/0055588 A1 | 3/2011 | DeHaan |
| 2011/0107103 A1 | 5/2011 | DeHaan |
| 2011/0119651 A1 | 5/2011 | Utschig-Utschig et al. |
| 2011/0131134 A1 | 6/2011 | Ferris |
| 2011/0131306 A1 | 6/2011 | Ferris |
| 2011/0131315 A1 | 6/2011 | Ferris |
| 2011/0131316 A1 | 6/2011 | Ferris |
| 2011/0131335 A1 | 6/2011 | Spaltro et al. |
| 2011/0153697 A1 | 6/2011 | Nicholov et al. |
| 2011/0167408 A1 | 7/2011 | Harmon |
| 2011/0170837 A1 | 7/2011 | Barnes, Jr. |
| 2011/0213686 A1 | 9/2011 | Ferris |
| 2011/0213687 A1 | 9/2011 | Ferris |
| 2011/0213691 A1 | 9/2011 | Ferris |
| 2011/0213713 A1 | 9/2011 | Ferris |
| 2011/0213719 A1 | 9/2011 | Ferris |
| 2011/0213875 A1 | 9/2011 | Ferris |
| 2011/0213884 A1 | 9/2011 | Ferris |
| 2011/0214124 A1 | 9/2011 | Ferris |
| 2011/0239190 A1 | 9/2011 | Mueller et al. |
| 2011/0131499 A1 | 11/2011 | Ferris |
| 2012/0131195 A1 | 5/2012 | Morgan |
| 2012/0204171 A1* | 8/2012 | Reisman .................. G06F 8/65 717/172 |
| 2012/0246207 A1* | 9/2012 | Evans ............... G06F 17/30126 707/829 |
| 2012/0246639 A1 | 9/2012 | Kashyap et al. |
| 2012/0260229 A1 | 10/2012 | Peraza et al. |
| 2014/0096123 A1 | 4/2014 | Boggs et al. |

OTHER PUBLICATIONS

White Paper—"Best Practices for Building Virtual Appliances", 2008 rPath, Inc., www.rpath.com, 6 pages.

Liu, Huan; "Rapid Application Configuration in Amazon Cloud using Configurable Virtual Appliances", 2011 ACM, SAC'11 Mar. 21-15, 2011, Taiwan, pp. 147-154; <http://dl.acm.org/citation.cfm?id+1982185.1982221&coll=DL&dl=GUIDE&CFID=268649706&CFTOKEN=27442775>.

VMware, "Best Practices for Building Virtual Appliances", 2007 VMware, Inc. pp. 1-7; <http://www.vmware.come/files/pdf/Best_Practices_Building_Virtual_Appliances.pdf>.

VMware, "User's Guide to Deploying vApps and Virtual Appliances", 2010 VMware, pp. 1-28; <http://www.vmware.com/support/developer/studio/studio21/va_user.pdf>.

VMware, "Virtual Appliances: A New Paradigm for Software Delivery," 2008 VMware, Inc., pp. 1-14; <http://www.vmware.com/files/pdf/vam/VMware_Virtual_Appliance_Solutions_White_Paper_08Q3.pdf>.

Weis et al., "Customizable Pervasive Application", 2006 IEEE, PERCOM'06, pp. 1-6; <http://ieeexplore.ieee.org/stamp/stamp.jsp?tp=&arnumber=1604813>.

Robison, D. "Billing simulation tool for commercial buildings;" Nov. 7, 2001; Fairmont Press Inc., Strategic Planning for Energy and the Environment, Fall 2001, vol. 21, No. 2, pp. 47-65.

Advisory Action for U.S. Appl. No. 12/130,982 dated Jan. 13, 2014.

Advisory Action for U.S. Appl. No. 12/130,982 dated May 23, 2012.

USPTO, Final Office Action for U.S. Appl. No. 12/131,004 dated Mar. 13, 2012.

USPTO, Office Action for U.S. Appl. No. 12/131,004 dated Sep. 28, 2012.

USPTO, Final Office Action for U.S. Appl. No. 12/131,004 dated Jan. 30, 2013.

USPTO, Office Action for U.S. Appl. No. 12/131,004 dated May 20, 2013.

USPTO, Final Office Action for U.S. Appl. No. 12/131,004 dated Oct. 23, 2013.

USPTO, Office Action for U.S. Appl. No. 12/131,004 dated Mar. 27, 2014.

USPTO, Office Action for U.S. Appl. No. 12/040,834 dated Jul. 18, 2011.

USPTO, Final Office Action for U.S. Appl. No. 12/040,834 dated Jan. 20, 2012.

USPTO, Office Action for U.S. Appl. No. 12/040,834 dated Aug. 30, 2012.

USPTO, Office Action for U.S. Appl. No. 12/040,834 dated Jan. 30, 2013.

USPTO, Final Office Action for U.S. Appl. No. 12/040,834 dated Jun. 19, 2013.

USPTO, Office Action for U.S. Appl. No. 12/040,834 dated Oct. 21, 2013.

USPTO, Final Office Action for U.S. Appl. No. 12/040,834 dated May 29, 2014.

USPTO, Office Action for U.S. Appl. No. 12/040,831 dated Aug. 22, 2011.

USPTO, Office Action for U.S. Appl. No. 12/040,831 dated Jan. 24, 2012.

(56) References Cited

OTHER PUBLICATIONS

USPTO, Office Action for U.S. Appl. No. 12/040,831 dated Jul. 5, 2012.
USPTO, Office Action for U.S. Appl. No. 12/040,831 dated Nov. 1, 2012.
USPTO, Notice of Allowance for U.S. Appl. No. 12/040,831 dated Feb. 5, 2013.
USPTO, Office Action for U.S. Appl. No. 12/040,810 dated Jul. 22, 2011.
USPTO, Final Office Action for U.S. Appl. No. 12/040,810 dated Jun. 5, 2012.
USPTO, Office Action for U.S. Appl. No. 12/040,810 dated Sep. 28, 2012.
USPTO, Final Office Action for U.S. Appl. No. 12/040,810 dated Jan. 29, 2013.
USPTO, Office Action for U.S. Appl. No. 12/040,810 dated May 23, 2013.
USPTO, Final Office Action for U.S. Appl. No. 12/040,810 dated Nov. 5, 2013.
USPTO, Office Action for U.S. Appl. No. 12/040,810 dated Mar. 27, 2014.
USPTO, Advisory Action for U.S. Appl. No. 12/040,810 dated Aug. 14, 2012.
USPTO, Advisory Action for U.S. Appl. No. 12/040,810 dated Apr. 8, 2013.
USPTO, Advisory Action for U.S. Appl. No. 12/040,810 dated Feb. 10, 2014.
USPTO, Office Action for U.S. Appl. No. 12/128,299 dated Aug. 17, 2011.
USPTO, Final Office Action for U.S. Appl. No. 12/128,299 dated Jan. 31, 2012.
USPTO, Office Action for U.S. Appl. No. 12/128,299 dated Sep. 17, 2012.
USPTO, Final Office Action for U.S. Appl. No. 12/128,299 dated Feb. 7, 2013.
USPTO, Office Action for U.S. Appl. No. 12/128,299 dated May 6, 2013.
USPTO, Office Action for U.S. Appl. No. 12/128,299 dated Oct. 9, 2013.
USPTO, Office Action for U.S. Appl. No. 12/128,299 dated Mar. 20, 2014.
USPTO, Final Office Action for U.S. Appl. No. 12/128,299 dated Sep. 9, 2014.
USPTO, Notice of Allowance for U.S. Appl. No.12/128,299 dated Dec. 3, 2014.
USPTO, Notice of Allowance for U.S. Appl. No. 12/128,299 dated Mar. 19, 2015.
Reimer, et al. "Opening Black Boxes: Using Semantec Information to Combat Virtual Machine Image Sprawl" published in VEE' 08 Proceedings of the Fourth ACM SIGPLAN/SIGOPS international conference on Virtual Execution Environment, pp. 111-120, ACM New York, NY USA 2008; table of contents ISBN: 978-1-59593-796-4.

* cited by examiner

MANAGING A SOFTWARE APPLIANCE

CROSS-REFERENCE TO RELATED APPLICATIONS

This application is a continuation of U.S. patent application Ser. No. 12/128,299, filed May 28, 2008, and hereby incorporated by reference.

FIELD

This invention relates generally to products and services, more particularly, to systems and methods for software appliance related services and products.

DESCRIPTION OF THE RELATED ART

The proliferation of the World Wide Web through the Internet has made a wealth of products and services available to users to purchase and use nearly instantaneously. Vendors, service providers, manufacturers, third party distributors, etc., may have websites for the users to review and purchase their respective products and/or services and to obtain technical support for the product and/or services.

Although most computers come pre-configured with some computer software, most users must install and/or configure additional computer software on their computer to tailor their computer for their particular needs. Such computer software installation and/or configuration can be as easy as a one-step activation of an installation program. Because of this complex nature, the post install configuration cannot be automated without some level of user interaction or knowledge of the pre-existing system. However, in order to make software truly operational, more complex computer applications require a user to perform post-installation configuration of the software. In addition to the initial configuration, the user is required to periodically update the software in order to fix bugs and errors.

Typically, the user must install, configure, and update each piece of software individually. As such, the user wastes time and resources on installing and configuring the software individually. Thus, there is a need in the art for methods and system that provides for unified management of software.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information and service portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

According to various embodiments, a management tool can be included in a software appliance. The management tool can be configured to provide control, management, and maintenance of the software appliance. The management tool can be utilized in order to start/stop, configure, repair, and update a software appliance. The management tool can be configured to provide an interface for management of the software appliance. The interface allows for management of the software appliance and the individual components of the software appliance.

By allowing a user to manage the software appliance utilizing the management tool, the user is not required to install, configure, and update the components of the software appliance, individually. Accordingly, the user can easily and efficiently manage the software appliance while saving time and resources in the process.

Figure 1:
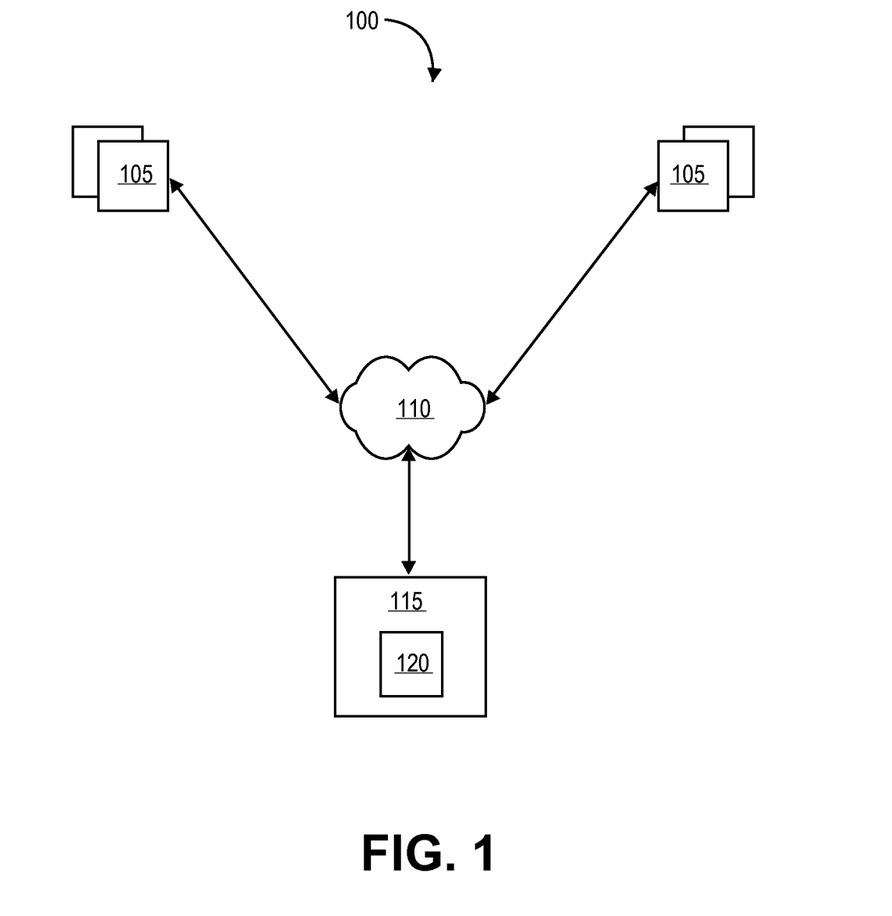
FIG. 1 depicts an exemplary system in accordance with an embodiment.

FIG. 1 illustrates an exemplary system 100 in accordance with an embodiment. It should be readily apparent to those of ordinary skill in the art that system 100 depicted in FIG. 1 represents a generalized schematic illustration and that other components may be added or existing components may be removed or modified. Moreover, system 100 may be implemented using software components, hardware components, or combinations thereof.

As shown in FIG. 1, system 100 includes users 105, a network 110 and a web service portal 115. Users 105 can be private individuals, employees of private business or public entities or other persons interested in accessing web service portal 115. Users 105 can access web service portal 115 using personal computers, personal mobile devices, workstations or other networked computing platforms.

Network 110 can be a combination of wide area and local area networks such as the Internet. Network 110 can be configured to provide a communication channel between users 105 and web service portal 115. Network 110 can implement a variety of network protocols to provide the communication channel such as Internet Protocol ("IP") Vx, ATM, SONET, or other similar network protocols.

Web service portal 115 can be configured to provide products and services to user 105 as well as provisioning, installation services, updates to software and hardware products and technical support. Web service portal 115 can, among other functions, provide a list of products such as software applications, software appliances and/or hardware devices as well as services such as installation, configuration, maintenance, etc., for users 105 to purchase. As a non-limiting example, web service portal 115 can also provide information for users to research, compare and purchase software, hardware and consulting services in support of those software and/or hardware purchases. Web service portal 115 can also be configured to provide support services, for free or by subscription, to those same software, service, and/or hardware purchases.

In accordance with various embodiments, web service portal 115 can be configured to provide an appliance support (AS) module 120 to provide software appliances to user 105 and support the software appliances.

Figure 2:
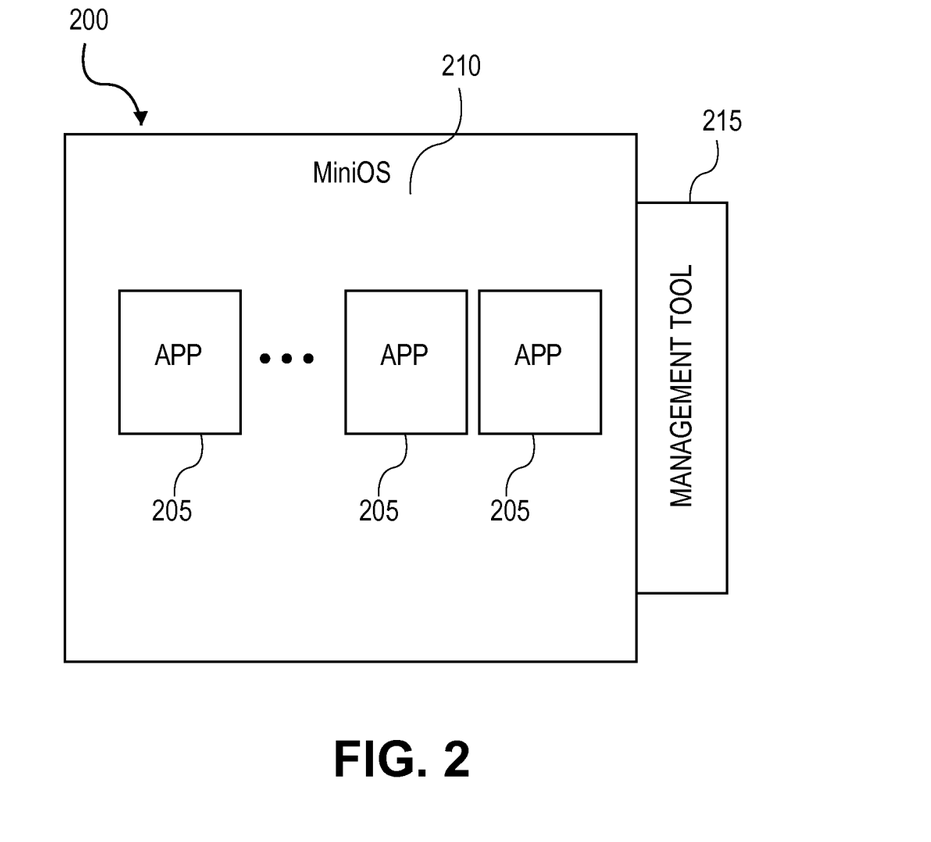
FIG. 2 illustrates an exemplary software appliance in accordance with various embodiments.

FIG. 2 shows an exemplary software appliance according to various embodiments. As shown, a software appliance 200 can comprise one or more applications 205 combined with a "minimum amount of an operating system" (MiniOS) 210 to allow application(s) 205 to run on a computing platform or in a virtual machine executing on a computing platform. MiniOS 210 can comprise a subset of the components of a complete OS that contains enough resources to support the application(s) 205 intended to be encapsulated with MiniOS 210. Software appliance 200 occupies less space than regular or self-standing applications and independent OSes, because MiniOS 210 includes a set of reduced features and components required to provide an application space for application(s) 205 of the software appliance.

Software appliance 200 comprises a binary image of application(s) 205 and selected MiniOS 210 contained in software appliance 200. The image contains the bits of software appliance 200 as installed on a computing platform. As such, to place software appliance 200 on computing platform, software appliance 200 only needs to be physically copied to the memory or storage of the computing platform and, then, configured to function with the computing platform or virtual machine running on the computing platform. In embodiments, software appliance 200 can be distributed via media such as CD-ROM, DVD-ROM, high-definition format discs or flash media, transmitted via a network, or can be downloaded from a Web site or other location.

Software appliance 200 can streamline the distribution of applications by minimizing the tasks typically associated with installation, configuration and maintenance. Software appliance 200 is completely functional as a self-contained unit, and requires no separately installed or configured OS to function. Inside software appliance 200, application(s) 205 and MiniOS 210 are pre-configured to function and operate together. As such, once software appliance 200 is placed on a computing platform or virtual machine, software appliance 200 only requires a configuration of the software appliance to the computing platform or virtual machine.

Additionally, software appliance 200 can be pre-configured for a specific client or computing platform on which it will be placed. Specifically, during creation of software appliance 200, MiniOS 210 and application(s) 205 of software appliance 200 can be pre-configured with the settings and parameters of the client or computing platform on which it will be placed. For example, if software appliance 200 includes a server OS and Email server application, the server OS and Email server application can be pre-configured to operate with the network settings of the computing platform it be placed and the network it will serve. Accordingly, software appliance 200 needs only to be placed on the target client or computing platform without additional configuration. In embodiments, software appliance 200 can be installed to a variety of clients, servers or other target devices, such as network servers, personal computers, network-enabled cellular telephones, personal digital assistants, media players, and others, such as illustrated in FIG. 1 above.

Software appliance 200 can also be updated and upgraded in by several different processes. Since software appliance 200 is a binary image, an updated or upgraded software appliance can be created as a completely new binary image of the entire software appliance incorporating the updates or upgrades. To update or upgrade software appliance 200 using a complete image, the updated or upgraded appliance can simply replace software appliance 200. Alternatively, software appliance 200 can be updated or upgraded incrementally. For each update or upgrade, the bits of the binary image required to update or upgrade software appliance 200 can be determined. To update or upgrade software appliance 200, the update bits can be added to software appliance 200 on a binary-difference basis.

Software appliance 200 can also be configured to communicate with a management tool 215. Management tool 215 can for example be utilized in order to start/stop, configure, repair, and update software appliance 200. Management tool 215 can manage the entire software appliance 200, including both application(s) 205 and MiniOS 210. Likewise, management tool 215 can include multiple tools, for instance to manage application(s) 205 and MiniOS 210, separately.

According to embodiments, management tool 215 can be embedded in software appliance 200 itself. In such implementations, software appliance 200 can be managed from the particular computing platform on which it is placed.

Returning to FIG. 1, according to various embodiments, AS module 120 can be configured to dynamically build software appliances for users 105. AS module 120 can be configured to build the software appliances based on a request by a user 105. The request can include a desired pre-built appliance or available applications to be included in a custom appliance. AS module 120 can be configured to build the requested appliance by retrieving the pre-configured appliance. Additionally, to build the custom appliance, AS module 120 can be configured to combine the applications with MiniOS to provide an execution platform for the applications.

Once the requested appliance is built, AS module 120 can be configured determine operating requirements for the complete software appliance. The operating requirements can include the minimum necessary computing requirements to utilize the software appliance, such as required storage space, required processing power, required execution memory.

Based on the minimum requirements, user 105 can accept the software appliance or request to reconfigure the software appliance. AS module 120 can be configured to provide the software appliance to user 105, if the user accepts the software appliance. Additionally, AS module 120 can be configured to repeat the building process if the user requests reconfiguration.

Figure 3:
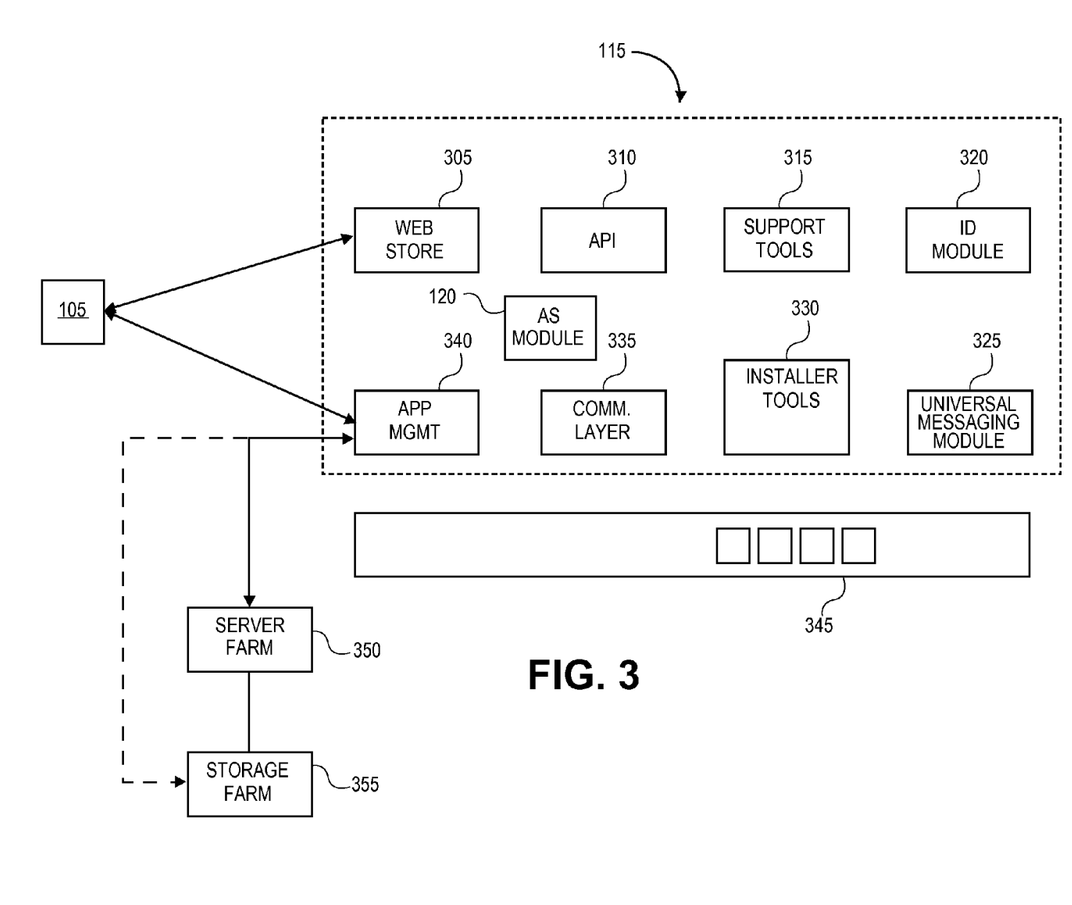
FIG. 3 illustrates an exemplary service portal of the system shown in FIG. 1 in accordance with another embodiment.

FIG. 3 illustrates a more detailed block diagram of web service portal 115 including AS module 120 in accordance with another embodiment. It should be readily apparent to those of ordinary skill in the art that web service portal 115 depicted in FIG. 3 represents a generalized schematic illustration and that other components may be added or existing components may be removed or modified.

As shown in FIG. 3, web service portal 115 can include a web store module 305 that a user can interface with the service portal. Web store module 305 can provide the graphical user interfaces ("GUIs") and associated functions and/or services for web service portal 115. As a non-limiting example, web store module 305 can generate a log-in GUI for a user to authenticate and enter web service portal 115.

Web store module 305 can couple with an application program interface ("API") module 310. API module 310 can be configured to provide an interface between the functions and/or services provided by web store module 305 and to the appropriate module of web service portal 115. More particularly, API module 310 can call or direct a requested function or service from the user to the respective module that provides that requested function or service. For example, a user may request a price of a product, e.g., product vending module, API module 310 can direct the request to a get price function in a support tools module 315. Additionally, a user may request a software appliance; API module 310 can direct the request to AS module 120.

API module 310 can also be configured to interface with support tools module 315. Support tools module 315 can be configured to provide the supporting software and hardware to implement the functionality of web service portal 115. Support tools module 315 can contain and provide access to databases that contain information such as products lines, software appliances services providers, on-line self-help (e.g., knowledgebase), etc. Support tools module 315 can also provide services like a chat services, a help desk, installation, provisioning, etc.

API module 310 can be further configured to couple with an identification ("ID") module 320. ID module 320 can be configured to provide identification management services for web service portal 115. ID module 320 can also store information related to users such as purchase history, user profile, usage history of the user, and entitlement data.

API module 310 can be further configured to couple with a universal messaging module 325. Universal messaging module 325 can be configured to provide a messaging application that unifies messages. More specifically, electronic mail ("email"), documents, and instant messaging can be linked in a single application. Universal messaging module 325 can also provide a mechanism for a user to view all the related documents for the user from email to Wiki pages.

An installer tools 330 can be coupled to API module 310. One of the services provided by web service portal 115 can be the purchase of software applications and software appliances provided by independent software vendors ("ISVs"). As part of the delivery of the software applications and appliances, the ISV can be required to maintain and update the installation tools to install their respective software applications and appliances. Accordingly, installer tools 330 can be a repository where independent software vendors can deposit their respective installation tools.

API module 310 can be further coupled to a communication layer 335 (labeled as COMM layer in FIG. 3). Communication layer 335 can be configured to provide the underlying services for the modules of web service portal 115 to communicate. For example, communication layer 335 can contain middleware for a product database to communicate with a graphical user interface requesting product description.

API module 310 can be further coupled to an application management module 340 (labeled as APP MGMT in FIG. 3). Application management module 340 can be configured to manage applications as requested by users. More specifically, a user may purchase a prepackaged software application pack (e.g., an operating system, electronic mail program and data mining program) from web service portal 115, which is stored in an application stack module 345. Application management module 340 can then deliver the purchased software stack, install and configure the software application stack at a third party site such as server farm 350 or store the software application stack in a storage farm 355 for the user to retrieve.

Server farm 350 can be configured to provide computing platforms for users to lease. Accordingly, users can have a backup version of their systems, a testing platform to perform quality assurance tests on new applications or new software appliances, execute a program requiring excessive MIPS, or any other similar computing task. Additionally, server farm 350 can be configured to store software appliances for download by users 105.

Storage farm 355 can be configured to provide storage space for users to lease. Accordingly, users can lease disk storage space to back up data, provide a hot data swap, or other storage intensive tasks. Additionally, storage farm 355 can be configured to store software appliances for download by users 105.

In some embodiments, AS module 120 can be configured to be executed in one of the other components (not shown). As illustrated, in other embodiments, AS module 120 can be executed as a standalone module.

Figure 4:
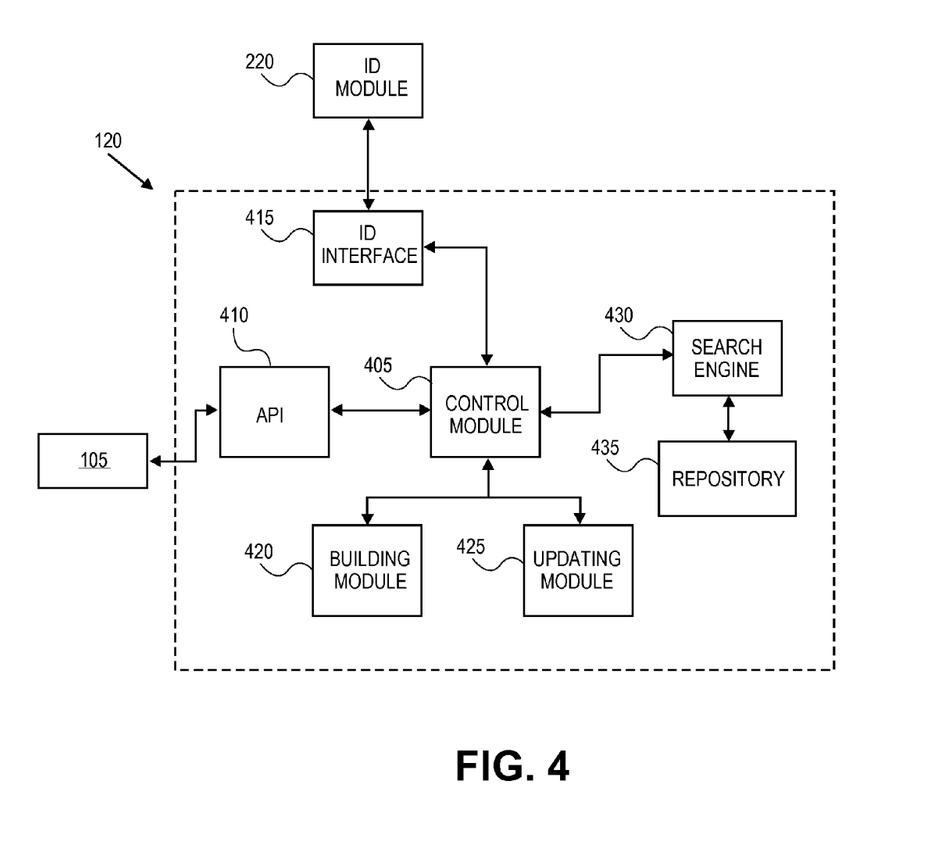
FIG. 4 depicts an exemplary AS module shown in FIG. 1 in accordance with yet another embodiment.

FIG. 4 depicts a more detailed block diagram of AS module 120 in accordance with another embodiment. It should be readily apparent to those of ordinary skill in the art that AS module 120 depicted in FIG. 4 represents a generalized schematic illustration and that other components may be added or existing components may be removed or modified.

As shown in FIG. 4, AS module 120 can comprise a control module 405, an application program interface ("API") 410, an identification ("ID") interface 415, a building module 420, an updating module 425, a search engine 420, and a repository 435. It should be readily obvious to one of ordinary skill in the art that the modules 405-435 can be implemented as software applications (programmed in C, C++, JAVA, PHP, etc.), hardware components (EEPROM, application specific integrated circuit, microprocessor, etc.) or combinations thereof.

Control module 405 can be configured to manage and interface with the other modules 410-435 to provide the functionality of the AS module 120 as described above and further described herein below. Additionally, control module 405 can be configured to interface with other modules such as ID module 320 via ID interface 415 as described above and further described herein below.

API 410 can be configured to generate GUIs, e.g. dialog boxes, web pages, as required by control module 405 and to provide an interface to other modules of web service portal 115. API 410 can be configured to operate in conjunction with web store 305 and API 310. For example, when a user 105 requests a software appliance related a service or product via web store 305, API 310 can pass the request to API 410. One skilled in the art will realize that API 410 is optional and that the functionality of API 410 can be performed by API 410.

AS module 120 can be configured to receive a request for a software appliance. In particular, API 410 can be configured to receive a request for a software appliance via web service portal 115. As such, API 410 can be configured to generate web pages in order to receive the request.

Likewise, API 410 can be configured to operate in conjunction with other modules of web service portal 115 such as universal messaging module 325. For example, a user 105 can submit a request for a software appliance in a message, such as an email. As such, API 310 can pass the request from universal messaging module 325 to API 410.

Control module 405 can be configured to receive the user's request for a software appliance via API 410. Control module 405 can be configured to receive a request to build an appliance. In order to build the requested appliance, control module 405 can be coupled to repository 435. Repository 435 can be implemented in any structure such as a database. For example, repository 435 can be implemented utilizing any type of conventional database architecture using open source technologies, proprietary technologies, or combinations thereof.

Repository 435 can be configured to store various pre-built software appliances based on the different functionally typically requested by users. For example, repository 435 can maintain various pre-built software appliances for roles such as Email Server appliance, application server appliance, customer relation management (CRM) appliance, enterprise resource planning (ERP) appliance, and the like. Repository 435 can be configured to store the binary image of the pre-built appliance. Repository 435 can also be configured to store a recipe of the software appliance. The recipe describes the bits that make up the software appliance.

As mentioned above in FIG. 2, the software appliance includes one or more application and MiniOS to support the applications. In addition to storing pre-built appliances and recipes, repository 435 can also be configured to store individual operating systems and individual applications. Repository 435 also can be configured to store versions of MiniOS to support individual applications. Repository 435 can be configured to store the individual applications, individual operating systems, and versions of MiniOS as separate binary images.

Repository 435 can also be configured to store the operating requirements for the pre-built software appliances, the individual applications, individual operating systems, and versions of MiniOS. The operating requirements can include the minimum necessary computing requirements to utilize the pre-built software appliances, the individual applications, individual operating systems, and versions of MiniOS. For example, the operating requirements can include required storage space, required processing power, required execution memory, and the like.

In order to build the appliance, control module 405 can be configured to retrieve the pre-built appliance, the recipe, and/or the necessary components to build the custom appliance based on the request, from repository 435. In order to locate and retrieve the pre-built appliance, the recipe, and/or components of the custom appliance, control module 430 can be coupled to search engine 430. Search engine 430 can be configured to allow control module 430 to search repository 435. Search engine 430 can allow control module 430 to search the repository based on the contents of the request.

In order to build the requested appliance, control module 405 can be coupled to building module 420. After retrieving the pre-built appliance, the recipe, and/or components of the custom appliance, control module 405 can be configured to pass the retrieved pre-built appliance, the recipe, and/or components of the custom appliance to building module 420. Building module 420 can be configured to build the appliance from the pre-built appliance, the recipe and/or the components of the custom appliance.

For example, if building module 420 receives a pre-built appliance, building module 420 can be configured to append a unique serial number to the pre-built appliance. Additionally, if building module 420 receives an application and a version of MiniOS, building module 420 can be configured to combine the bits of the binary image of the application and version of MiniOS in order to create the binary image of the custom software appliance. Building module 420 can be configured to use the recipe to build the appliance.

Additional, if building module 420 receives an application and complete OS, building module 420 can be configured to generate a version of MiniOS to support the received application. Building module 420 can be configured to combine the bits of the binary image generated the version of the MiniOS and the received application. Building module 420 can be configured to generate a unique serial number for the custom appliance and append the serial number to the custom appliance.

After building the appliance, control module 405 can be configured to provide the complete appliance to the user. Control module 405 can be configured to pass the appliance to API 410. API 410 can then be configured to provide the appliance to the user. API 410 can be configured to pass the complete appliance to universal messing module 325 in order to be transmitted to the user. For example, universal messaging module 325 can transmit the complete appliance to the user in an email message.

Additionally, API 410 can place the complete appliance in a repository such as server farm 350 or storage farm 355 for downloading at a later time. As such, API 410 can instruct universal messaging module to transmit a link to the user to allow the user to download the complete appliance. Also, API 410 can be configured to instruct web store 305 to provide the link in a web page.

In the building process described above, control module 405 can also be configured to include identifying information of the user in the complete software appliance. As such, control module 405 can be configured to append ID information of the user requesting the appliance to the complete appliance. To achieve this, control module 305 can be coupled to ID interface 415. ID interface 415 can be coupled to ID module 320 of web service portal 115. Control module can utilize ID interface 415 to retrieve the ID information for the user.

AS module 120 can be configured to maintain a record of appliances provided to users. In particular, control module 405 can be configured to generate a record of appliances provided to users. The record can include the all appliances provided to the user associated with the ID information of the user. The records can also include the unique serial numbers of the appliances.

AS module 120 can also be configured to update and upgrade previously provided appliances. To achieve this, control module 405 can be coupled to updating module 425. Updating module 405 can be configured to update and upgrade software appliances by several different processes.

Since a software appliance is a binary image, updating module 405 can be configured to updated or upgrade a software appliance by creating a completely new binary image of the entire software appliance incorporating the updates or upgrades. To update or upgrade the software appliance using a complete image, updating module 425 can be configured to create the updated or upgraded appliance. AS module 120 can be configured to provide the updated or upgraded appliance to the user to simply replace the existing software appliance.

Alternatively, updating module 425 can be configured to update or upgrade a software appliance incrementally. For each update or upgrade, updating module 425 can be configured to determine the bits of the binary image required to update or upgrade a software appliance. AS module 120 can be configured to provide the update or upgrade bits to the user. To update or upgrade the software appliance, the user can add the update or upgrade bits to the software appliance on a binary-difference basis.

According to embodiments, AS module 120 can be configured to build the software appliance to include a management tool 215. AS module 120 can be configured to embed management tool 215 in the complete software appliance. Management tool 215 can be configured to provide control, management, and maintenance of the software appliance. For example, management tool 215 can be utilized in order to start/stop, configure, repair, and update a software appliance. Management tool 215 can be configured to manage the entire software appliance, including both applications and MiniOS of the software appliance. Likewise, management tool 215 can be configured to include multiple tools, for instance to manage applications and MiniOS of the software appliance.

In order to build the appliance including the management tool 215, repository 435 can be configured to store pre-built appliances that include management tool 215. Additionally, building module 420 can be configured to generate management tool 215 for a custom appliance. Building module 420 can be configured to generate management tool 215 to provide control, management, and maintenance of the custom software appliance. Building module 215 can combine management tool 215 with the custom software appliance.

Figure 5:
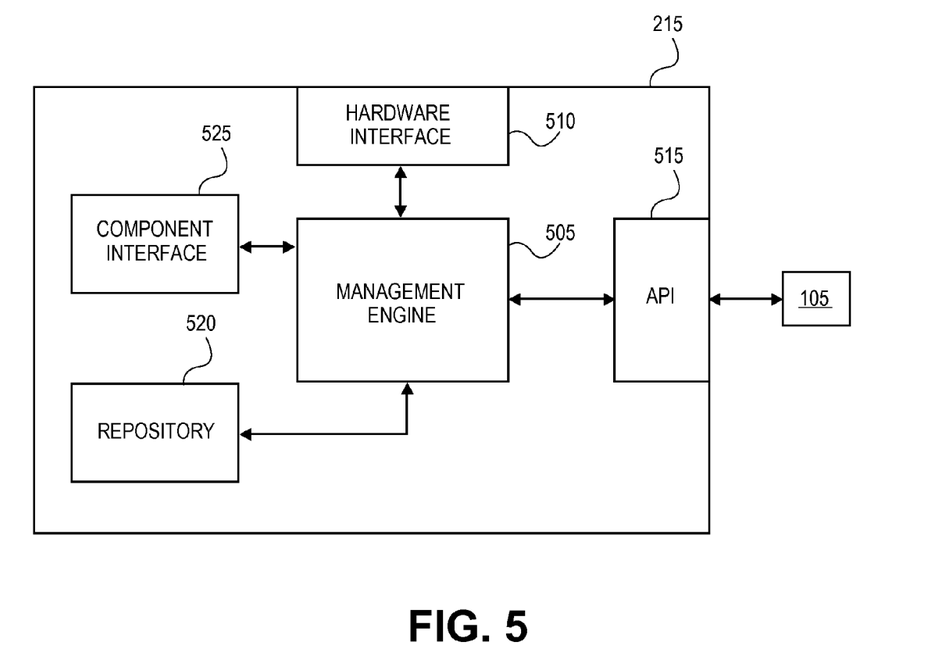
FIG. 5 illustrates an exemplary management tool in accordance with yet another embodiment.

FIG. 5 shows exemplary components of management module 215. Management module 215 can comprise a management engine 505, a hardware interface 510, an application program interface ("API") 515, a repository 520, and a component interface 525. It should be readily obvious to one of ordinary skill in the art that the modules 505-525 can be implemented in the same format as the software appliance.

Management engine 505 can be configured to manage and interface with the other modules 510-525 to provide the functionality of the management tool 215 as described above and further described herein below.

Management engine 505 can be coupled to hardware interface 510. Hardware interface 510 can be configured to provide an interface between management tool 215 and hardware of a computing platform implementing the software appliance. Hardware interface 510 can be configured to retrieve information, settings, and parameters from the hardware of the computing platform implementing the software appliance. Additionally, hardware interface 510 can be configured to provide the hardware of the computing platform with the settings and parameters of the software appliance.

Management engine 505 can be coupled to API 510. API 510 can be configured to generate GUIs as required by management engine 505. API 510 can be configured to generate GUIs that allow user 105 to interface with management tool 215. API 510 can be configured to interface with other systems such as web service portal 115. API 510 can be configured to generate GUIs that contains components, such as widgets, text fields, selection buttons and the like, to allow the user to start/stop, configure, repair, and update a software appliance.

Figure 6:
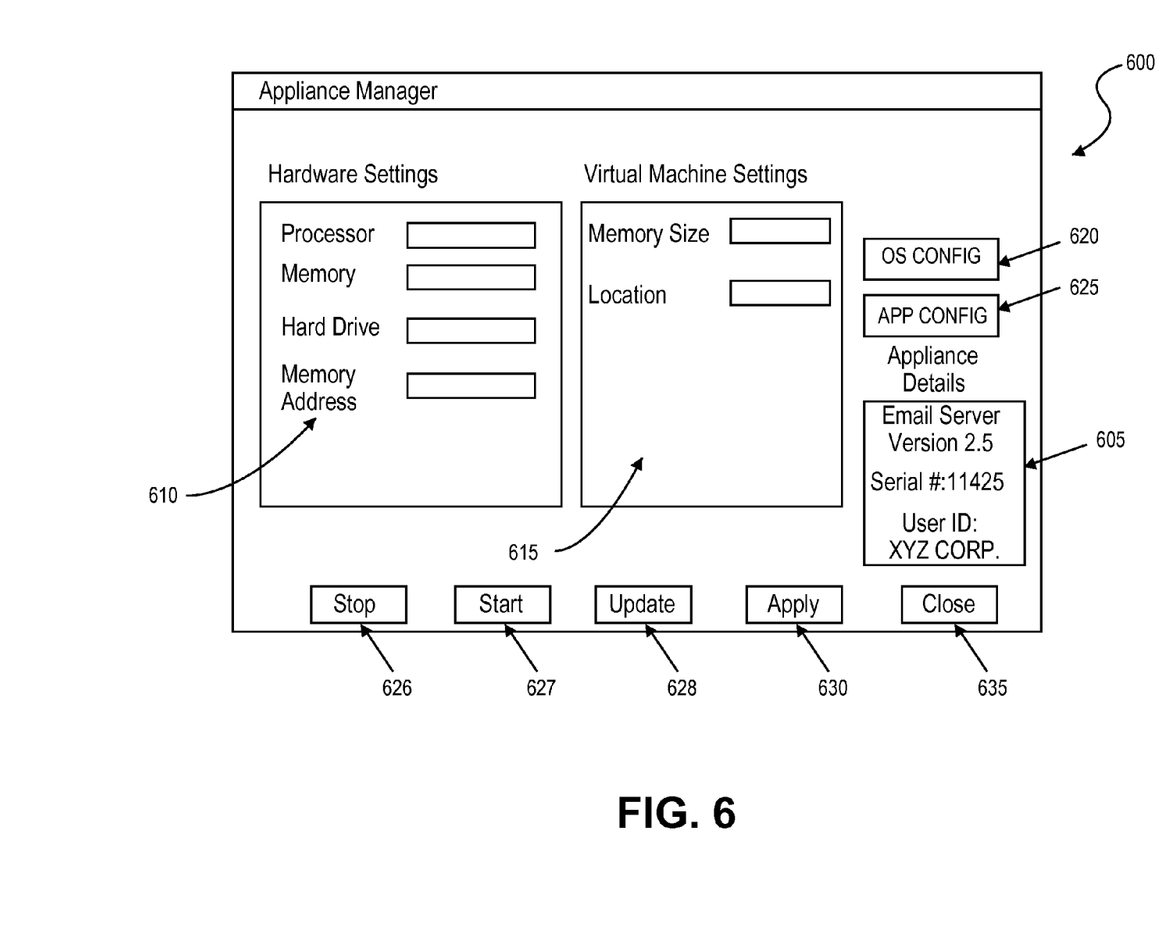
FIG. 6 depicts an exemplary management interface in accordance with yet another embodiment.

FIG. 6 show an exemplary appliance manager GUI 600 for providing the functionality of management tool 215. It should be readily apparent to those skilled in the art that GUI 600 is exemplary and that GUI 600 can include additional components.

As shown, GUI 600 can be configured to include appliance details field 605, hardware settings field 610, virtual machine settings field 615, an OS configuration button 620, an application configuration button 625, a stop button 626, a start button 627, a update button 628, an apply button 630, and close button 635.

Appliance details field 305 can be configured to display the details of the software appliance managed by management tool 215. For example, appliance details fields 305 can display the type of the software appliance, the version of the software appliance, the serial number of the software appliance, and the ID information of the user associated with the software appliance.

Hardware settings field 610 can be configured to display the details of the hardware of the computing platform implementing the software appliance. For example, hardware settings field 610 can be populated with information retrieved via hardware interface 510. Additionally, hardware settings field 610 can be configured to be interactive. As such, a user 105 can enter the settings of the computing platform utilizing hardware settings field 610. Management tool 215 can utilize the details of the hardware in order to configure the software appliance.

Virtual machine settings field 615 can be configured to display the settings of a virtual machine implementing the software appliance. For example, virtual machine settings field 615 can be populated with information retrieved via hardware interface 510. Additionally, virtual machine settings field 615 can be configured to be interactive. As such, a user 105 can enter the settings of the computing platform utilizing virtual machine settings field 615. When software appliance is implemented in a virtual machine, management module 215 can utilize the settings of the virtual machine in order to configure the software appliance.

OS configuration button 620 can be configured to initiate configuration of the MiniOS of the software appliance. For example, in response to selection of button 620, management engine 505 can be configured to access the MiniOS of the software appliance in order to configure the MiniOS. Management engine 505 can retrieve a configuration interface from the MiniOS and present the configuration interface via API 510. Management engine 505 can pass the configuration information received to the MiniOS via component interface 525.

Application configuration button 625 can be configured to initiate configuration of applications of the software appliance. For example, in response to selection of button 625, management engine 505 can be configured to access the applications of the software appliance in order to configure the applications. Management engine 505 can retrieve configuration interfaces from the applications and present the configuration interfaces via API 510. Management engine 505 can pass the configuration information received to the applications via component interface 525.

Stop button 626 can be configured to halt the operation of the software appliance. By selecting stop button 626, management engine 505 can be configured to halt the operation of the MiniOS and the applications. To halt the operation, management engine 505 can pass a halt command via component interface 525.

Start button 627 can be configured to initiate operation of the software appliance. By selecting start button 627, management engine 505 can be configured to initiate the operation of the MiniOS and the applications. To initiate the operation, management engine 505 can pass a start command via component interface 525.

Update button 628 can be configured to initiate an update process for the software appliance. By selecting update button 628, management engine 505 can be configured to transmit an update request to AS module 120 via API 515.

Management engine 505 can be configured to include the details of the software appliance with the request.

Apply button 630 can be configured to apply the settings entered into GUI 600 to the software appliance. Close button 630 can be configured to close GUI 600 upon selection by user 105.

Management engine 505 can be coupled to repository 520. Repository 520 can be configured to store the details, parameters, and settings of the software appliance. Repository 520 can be configured to store the details of the software appliance, such as the type of appliance, version of the appliance, application and MiniOS contained in the appliance, serial number of the software appliance, and ID information of the user. Repository 520 can be configured to store configuration information entered in GUIs generated by API 515. Additionally, repository 520 can be configured to store information retrieved from hardware interface 510 and component interface 525.

Management engine 505 can be coupled to component interface 525. Component interface 525 can be configured to provide an interface between management tool 215 and the components of the software appliance, such as application and MiniOS. Component interface 525 can be configured to retrieve information from the components of the software appliance. Component interface 525 can be configured to send information to the components of the software appliance.

Figure 7:
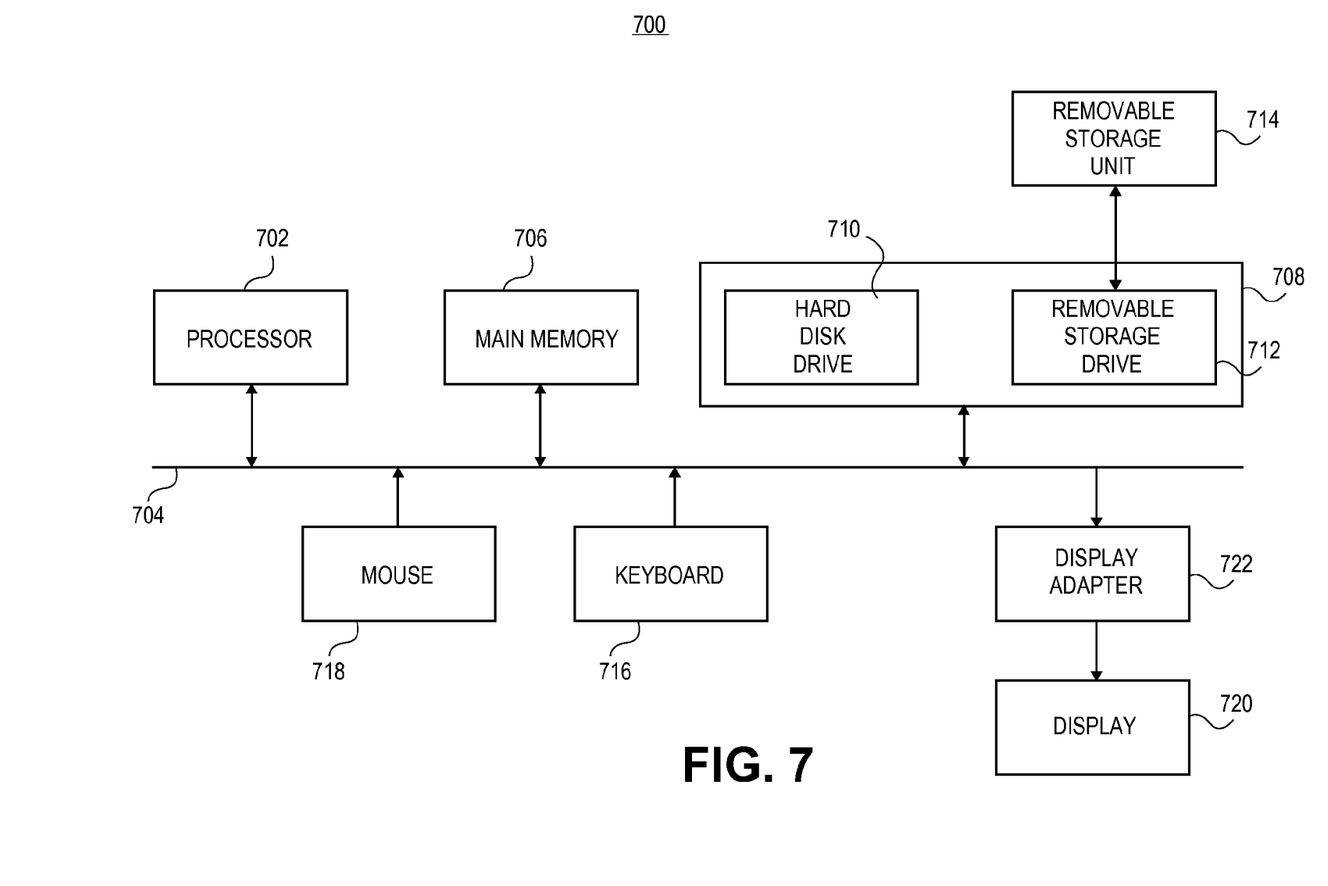
FIG. 7 depicts an exemplary computing platform in accordance with yet another embodiment.

FIG. 7 illustrates an exemplary block diagram of a computing platform 700 where an embodiment may be practiced. The functions of the AS module 120 can be implemented in program code and executed by computing platform 700. AS module 120 may be implemented in computer languages such as PASCAL, C, C++, JAVA, etc.

As shown in FIG. 7, computing platform 700 includes one or more processors, such as processor 702 that provide an execution platform for embodiments of AS module 120. Commands and data from processor 702 are communicated over a communication bus 704. Computing platform 700 also includes a main memory 706, such as a Random Access Memory (RAM), where AS module 120 can be executed during runtime, and a secondary memory 708. Secondary memory 708 includes, for example, a hard disk drive 710 and/or a removable storage drive 712, representing a floppy diskette drive, a magnetic tape drive, a compact disk drive, etc., where a copy of a computer program embodiment for AS module 120 can be stored. Removable storage drive 712 reads from and/or writes to a removable storage unit 714 in a well-known manner. A user interfaces with the AS module 120 with a keyboard 716, a mouse 718, and a display 720. Display adapter 722 interfaces with the communication bus 704 and display 720. Display adapter 722 also receives display data from processor 702 and converts the display data into display commands for display 720.

Additionally, software appliances including management tools, such as software appliance 200, can be implemented on an exemplary computing platform 700. For example, processor 702 can provide an execution platform for embodiments of the software appliance. The software appliance can be executed during runtime on main memory 706. The binary image of the software appliance can be stored in secondary memory 708.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
   receiving from a user a request for a custom software appliance to be executed by a computing device, the request specifying functionality of the custom software appliance;
   searching in a repository, by a processor, in view of the functionality, for a pre-built software appliance, a recipe, an application, and a reduced version of an operating system, the reduced version of the operating system having enough resources to provide an execution platform for the application;
   building, by the processor, the custom software appliance in view of the pre-built software appliance, the recipe, the application, and the reduced version of the operating system, wherein the custom software appliance comprises identifying information of the user;
   generating, by the processor, a management tool of the custom software appliance, wherein the management tool is to provide an interface for the custom software appliance when executed by the computing device, and wherein the management tool comprises:
      a hardware interface to retrieve at least one of information, settings or parameters from hardware of the computing device; and
      a component interface to connect to the application and a portion of the reduced version of the operating system;
   embedding, by the processor, the management tool within the custom software appliance, wherein the custom software appliance comprises the management tool, the application, and the reduced version of the operating system;
   storing the custom software appliance, with the management tool embedded, in the repository; and providing, by the processor, a copy of the custom software appliance to the computing device, wherein the management tool is to receive a management request from the user via the interface.

2. The method of claim 1, wherein the management tool is to display in the interface a description of the application and a description of the reduced version of the operating system when the custom software is executed by the computing device.

3. The method of claim 1, wherein the management request specifies a description of a computing platform implementing the custom software appliance.

4. The method of claim 1, wherein the management request comprises a request to provide configuration information to at least one of the application or the reduced version of the operating system.

5. The method of claim 1, wherein the pre-built software appliance comprises a plurality of bits of a binary image described by the recipe and the custom appliance comprises a plurality of bits of a binary image described by the recipe.

6. The method of claim 1, wherein the management request comprises a request for the management tool to perform at least one of halting the custom software appliance or initiating the custom software appliance.

7. The method of claim 1, wherein the management request comprises a request for the management tool to initiate updating of the custom software appliance.

8. An apparatus comprising:
a memory
a processor operatively coupled to the memory to:
receive from a user a request for a custom software appliance to be executed by a computing device, the request specifying functionality of the custom software appliance;
search in a repository, in view of the functionality, for a pre-built software appliance, a recipe, an application, and a reduced version of an operating system, the reduced version of the operating system having enough resources to provide an execution platform for the application, wherein the pre-built software appliance comprises a plurality of bits of a binary image described by the recipe;
build the custom software appliance in view of the pre-built software appliance, the recipe, the application, and the reduced version of the operating system, wherein the custom software appliance comprises identifying information of the user;
generate a management tool of the custom software appliance, wherein the management tool is to provide an interface for the custom software appliance when executed by the computing device, and wherein the management tool comprises:
a hardware interface to retrieve at least one of information, settings or parameters from hardware of the computing device; and
a component interface to connect to the application and the reduced version of the operating system;
embed the management tool within the custom software appliance, wherein the custom software appliance comprises the management tool, the application, and the reduced version of the operating system;
store the custom software appliance, with the management tool embedded, in the repository; and
provide a copy of the custom software appliance to the computing device, wherein the management tool is to receive a management request from the user via the interface.

9. The apparatus of claim 8, wherein the management tool is further to display, in the interface, a description of the application and a description of the reduced version of the operating system when the custom software is executed by the computing device.

10. The apparatus of claim 8, wherein the management request specifies a description of a computing platform implementing the custom software appliance.

11. The apparatus of claim 8, wherein management request comprises a request to provide configuration information to at least one of the application or the reduced version of the operating system.

12. The apparatus of claim 8, wherein the custom appliance comprises a plurality of bits of a binary image described by the recipe.

13. The apparatus of claim 8, wherein the management request comprises a request for the management tool to perform at least one of halting the custom software appliance or initiating the custom software appliance.

14. The apparatus of claim 8, wherein the management request comprises a request to initiate an update of the custom software appliance.

15. A non-transitory machine-readable storage medium including instructions that, when accessed by a processor, cause the processor to:
receive from a user a request for a custom software appliance to be executed by a computing device, the request specifying functionality of the custom software appliance;
search in a repository in view of the functionality, for a pre-built software appliance, a recipe, an application, and a reduced version of an operating system, the reduced version of the operating system having enough resources to provide an execution platform for the application, wherein the pre-built software appliance comprises a plurality of bits of a binary image described by the recipe;
build the custom software appliance in view of the pre-built software appliance, the recipe, the application, and the reduced version of the operating system, wherein the custom software appliance comprises identifying information of the user;
generate a management tool of the custom software appliance, wherein the management tool is to provide an interface for the custom software appliance when executed by the computing device, and wherein the management tool comprises:
a hardware interface to retrieve at least one of information, settings or parameters from hardware of the computing device; and
a component interface to connect to the application and the reduced version of the operating system;
embed the management tool within the custom software appliance, wherein the custom software appliance comprises the management tool, the application, and the reduced version of the operating system;
store the custom software appliance, with the management tool embedded, in the repository; and
provide a copy of the custom software appliance to the computing device, wherein the management tool is to receive a management request from the user via the interface.

16. The non-transitory machine-readable storage medium of claim 15, wherein to provide the interface the management tool is to:

display, in the interface, a description of the application and a description of the reduced version of the operating system when the custom software is executed by the computing device.

17. The non-transitory machine-readable storage medium of claim 15, wherein the management request specifies a description of a computing platform implementing the custom software appliance.

18. The non-transitory machine-readable storage medium of claim 15, wherein the management request comprises a request to provide configuration information to at least one of the application or the reduced version of the operating system.

19. The non-transitory machine-readable storage medium of claim 15, wherein and the custom appliance comprises a plurality of bits of a binary image described by the recipe.

20. The non-transitory machine-readable storage medium of claim 15, wherein management request comprises a request for the management tool to perform at least one of halting the custom software appliance or initiating the custom software appliance.

\* \* \* \* \*